United States Patent [19]

Martin

[11] Patent Number: 4,909,698
[45] Date of Patent: Mar. 20, 1990

[54] BALE HANDLING APPARATUS
[75] Inventor: Melvin K. Martin, Elmira, Canada
[73] Assignee: M.K. Martin Enterprise Inc., Canada
[21] Appl. No.: 124,612
[22] Filed: Nov. 24, 1987
[51] Int. Cl.⁴ ............................................. B65G 67/04
[52] U.S. Cl. .................................. 414/501; 414/789.7; 414/111; 414/518; 414/519; 56/449
[58] Field of Search ............... 414/486, 491, 492, 501, 414/502, 503, 504, 507, 518, 519, 520, 551, 111, 25, 467, 789.7, 546; 56/449

[56] References Cited

U.S. PATENT DOCUMENTS

| | | |
|---|---|---|
| 1,912,232 | 5/1933 | Wehrhahn et al. |
| 2,372,902 | 4/1945 | Lewis ................................ 414/111 X |
| 2,845,770 | 8/1958 | Fessler . |
| 3,229,834 | 1/1966 | Dodd et al. ...................... 414/519 X |
| 3,302,807 | 2/1967 | Blair . |
| 3,308,971 | 3/1967 | Sinden et al. ......................... 414/44 |
| 3,515,290 | 6/1970 | Hill et al. ........................... 414/44 X |
| 3,572,527 | 3/1971 | Butler ................................... 414/518 |
| 3,924,757 | 12/1975 | Meyer . |
| 4,051,964 | 10/1977 | Meijer . |

FOREIGN PATENT DOCUMENTS

| | | |
|---|---|---|
| 184650 | 5/1918 | Canada . |
| 272595 | 7/1927 | Canada . |
| 772974 | 12/1967 | Canada . |
| 868753 | 4/1971 | Canada . |
| 3000711 | 7/1981 | Fed. Rep. of Germany ...... 414/111 |
| 2421547 | 12/1979 | France ................................ 414/551 |
| 1574129 | 9/1980 | United Kingdom ................ 414/111 |

Primary Examiner—Frank E. Werner
Attorney, Agent, or Firm—Stevens, Davis, Miller & Mosher

[57] ABSTRACT

A bale handling system which avoids the necessity of using a thrower mechanism. A loading chute guides the bales from the baler to the hay basket. The chute guides the bales of hay up and into the hay basket without any mechanical assistance being provided aside from the force of the baler ejecting additional bales of hay. The chute reliably guides the bales of hay to the hay basket even when the baler is turning at sharp angles or is in rough ground.

5 Claims, 4 Drawing Sheets

BALE HANDLING APPARATUS

A conventional hay baler is often fitted with a thrower mechanism which is driven along the windrow to propel the bales of hay from the baler into a wagon rack or hay basket. As the bale is formed in the balechamber of the baler it is pushed to the rear by a plunger. The bale is then tied and pushed into a thrower mechanism which throws the bale of hay into a wagon rack or hay basket.

The use of a bale thrower has restricted the speed with which the baler can be operated and furthermore often has resulted in bending or deformation of the hay baskets due to the force of the bales impacting upon the hay baskets after being thrown. Bale throwers tend, when the baler is turning a corner or travelling over uneven terrain, to throw bales so that they do not land in the wagon rack or hay basket. Further, with the addition of a thrower the total length of machinery is extended resulting in a larger than desirable turning radius. Traditional bale throwers are expensive and fairly complicated devices which are prone to jamming and similar problems.

Other previous designs have attempted to overcome some of these problems; however these have involved the use of mechanical conveyers to transport the baled hay from the baler to the hay basket. These tend to introduce additional mechanical complications and are more costly than a traditional bale thrower.

Accordingly the invention herein comprises an improved hay basket which communicates directly with the baler via a chute means and which avoids the necessity of using a thrower mechanism. The bale outlet of the conventional baler communicates with guide means forming part of the chute means of the hay basket, which guide means directs the bales from the baler to a chute inlet. The chute means then guide the bales up and through the chute outlet into the bale accumulator or container without any mechanical assistance being provided aside from the force exerted by the baler plunger in ejecting additional bales of hay. A further advantage of a hay basket of this invention is that the guide means reliably guide the bales to the hay basket even when the baler is turning at sharp angles or moving over uneven terrain.

The hay basket includes a support frame on which is mounted a bale accumulator or container. Also mounted on the support frame is a conventional hitch means for attaching the hay basket to the baler. Mounted on the support frame forward of the bale accumulator is a chute which in use contains the bales as they are ejected from the baler in an end to end relationship so that each successive bale ejected by the baler causes the previously ejected bales to move up the chute until they reach its outlet and fall into the bale accumulator.

In addition, mounted on the hay basket frame are three wheels, two fixed wheels on the rear of the frame and a single pivoting castored wheel on the front of the frame which permits easy maneuverability both when the hay basket is attached to the baler and when the hay basket is detached from the baler to transport the baled hay. Furthermore the container permits the bales to fall in a good stacking position to obtain a maximum number of bales in the container before unloading is required. The container permits easy removal of the bales through the use of a hinged end gate comprising the full width of the basket.

In drawings which illustrate an embodiment of the invention:

In the following descriptions the corresponding elements as shown in each figure of the drawings are given the same reference numbers.

Figure 1:
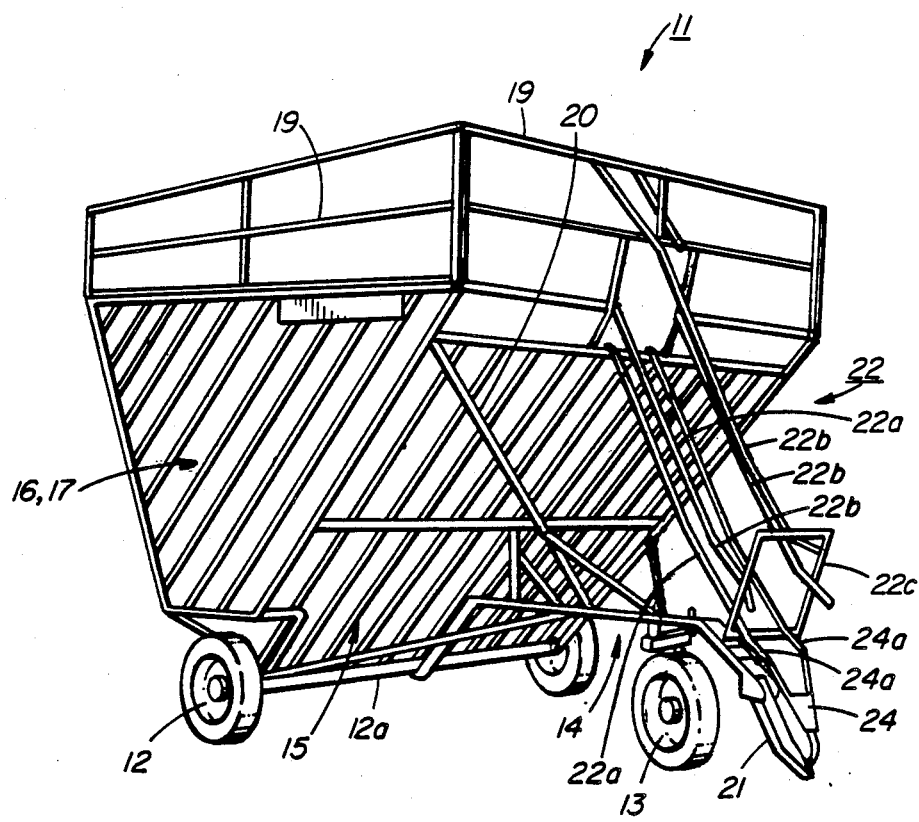
FIG. 1 is a perspective view of a hay basket being one embodiment of the present invention.

Referring now to FIG. 1, the hay basket 10 is shown as including a bale accumulator or container 11, which is mounted on a main support frame 14. The support frame 14 is mounted on a plurality of wheels comprising two fixed rear wheels 12 secured at opposing ends of transverse member 12a, and one pivotally mounted or castored forward wheel 13. The container 11, (of an open lattice work-like construction of bars or tubes welded together) in side view is roughly triangular in outline shape with one apex of the triangle pointing downward to permit the bales of hay to fall within the container in a good stacking position to enable a maximum number of bales to accumulate in the container before unloading is required. Container 11 is rectangular in outline shape in top plan view (not shown).

The container 11 comprises a floor section 15, side wall sections 16 and 17, and a rear end gate 18, together with rear, front and side extensions 19 and suitable V-configuration bracing means 20 to join the front of the container 1 to the forward end of support frame 14. At the front of the support frame 14 is located a conventional hitch means 21 for attaching the hay basket to the hay baler which is well known to those skilled in the art.

Figure 2:
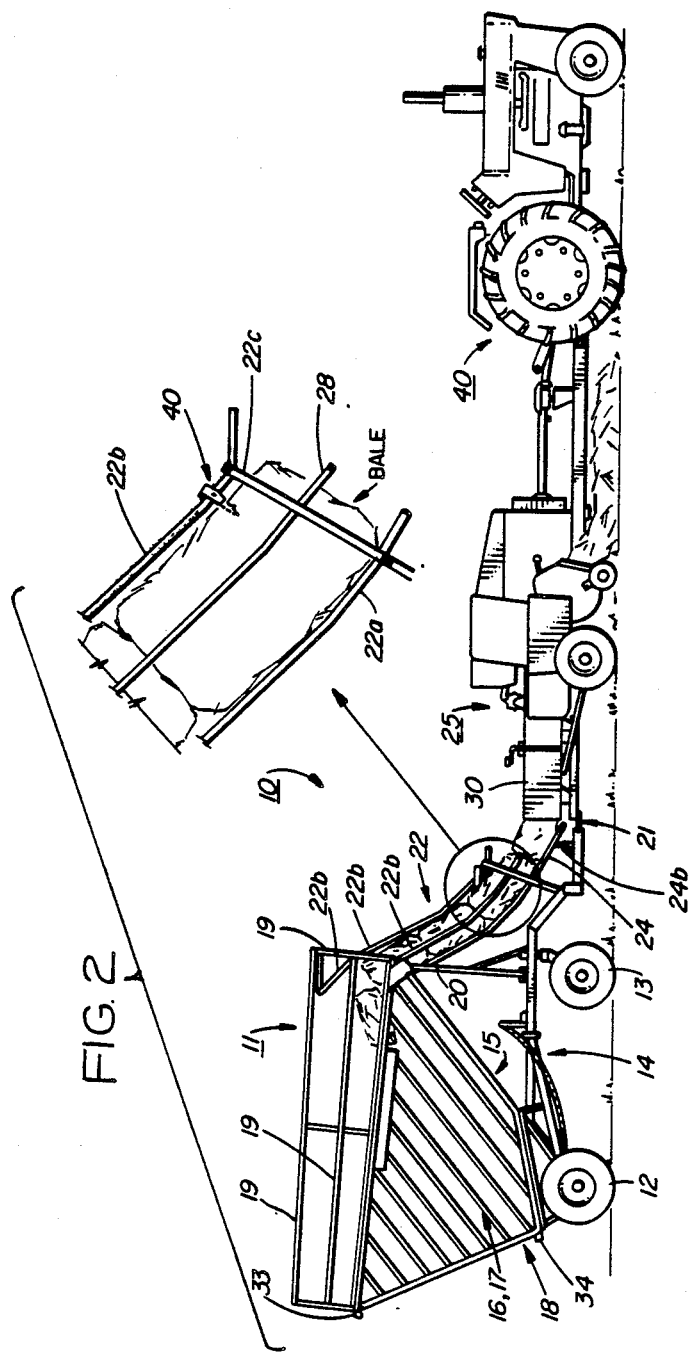
FIG. 2 is a side view of the hay basket of FIG. 1 attached to atypical conventional baler and tractor.

Referring now to FIG. 2, attached to the upper front of the container is an upwardly and rearwardly inclined chute 22, which has a cross sectional dimension roughly approximating that of the bales. The chute is composed of any suitable material that would limit friction between the bales and the chute material and is preferably composed of a plurality of elongated metallic tubes or bars 22 affixed at their lower ends to a rectangular chute frame 22c (FIG. 6) and at their upper ends to the upper frontal bars of the container 11. Chute frame 22c is supported from the forward end of the main support frame 14. There should be at least two guide bars 22a on the bottom of the chute to adequately support the weight of the bales while being transported, together with at least one guide bar 22 on each of the remaining three sides to contain the bales in an end to end relationship as they are pushed upwardly and through the chute. At the front of the chute 22 are inlet guide means 23 which serve to direct the bales into the chute even when the baler and hay basket are turning or travelling over uneven terrain.

Figure 4:
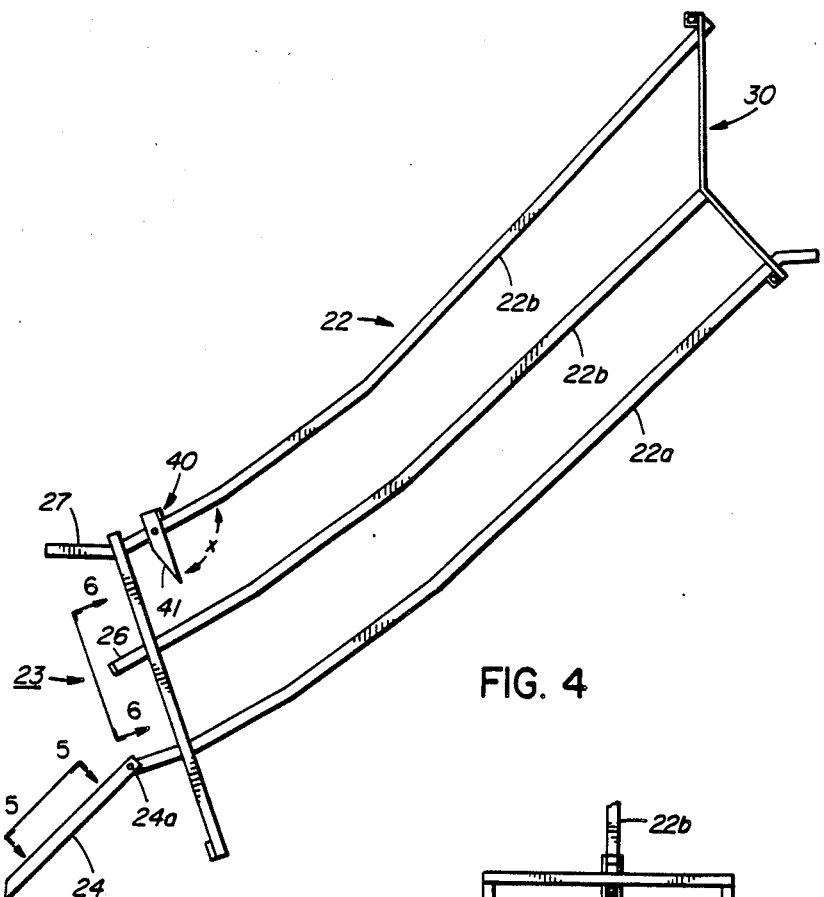
FIG. 4 is a side elevation view of the chute means.
Figure 5:
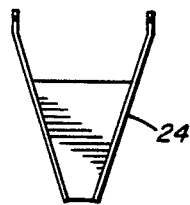
FIG. 5 is a top plan view along line 5—5 of FIG. 4.
Figure 6:
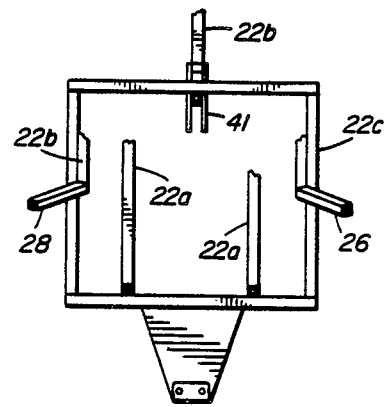
FIG. 6 is an end view looking in the direction of the arrows along line 6—6 of FIG. 4.

Referring now to FIG. 4 the inlet guide means 23 preferably comprise an extension 24 which supports the bales from below and which is generally triangular shaped in outline in plan view as shown in FIG. 5. Extension 24 is pivotably attached at 24a to the bottom end of the chute and supported by strut 24b from the hitch 21 for upward and downward pivotal motion therewith and adapted to extend below the bale outlet of the baler 25. Guide means 23 also includes outwardly flared extensions 26, 27, and 28 of the guide bars 22b which extend forwardly from the top and sides of the chute frame 22c towards the baler outlet 30, each extension being gradually flared to create a funnel-like guide means with cross-sectional dimensions which increase to a maximum closest to the bale outlet as shown in FIG. 6.

The chute means 22, in use, is adapted to contain the bales in an end to end relationship as they move from the inlet guide means 24, 25, 26 and 27 gradually upward to the chute outlet 30 at the top of the container 11 at which point the bales are permitted to fall and accumulate in the container 11.

On the chute means 22 a pivoting stop means 40 is provided adjacent the inlet guide means that pivots in the direction of arrow X to permit the bales of hay to move up the chute but which pivots to the stop position shown in FIG. 4 once the baler is disconnected from the hay basket to prevent the bales from sliding back down the chute. The stop means comprises a simple rearwardly pivoting pawl-like member 41 as shown in the drawings pivotally connected to the upper guidebar 22b.

In use the hay basket is hitched to the baler 25 which is propelled through a conventional tractor 40a, which provides the power to the baler. The baler picks up the cut hay, straw or other grass-like material which is then baled in the conventional manner to produce standard square bales. Once the bales have been tied they are ejected from the bale outlet 30 of the baler by the action of the baler ram and then guided by the inlet guide means 23 described above into the inlet of the chute 22 and thence upwardly through the chute into the container 11. Due to the gradual upward slope of the chute, no mechanical means are necessary to propel the bales up to the top of the basket aside from the force that is generated by the expulsion of the bales from the baler.

Figure 3:
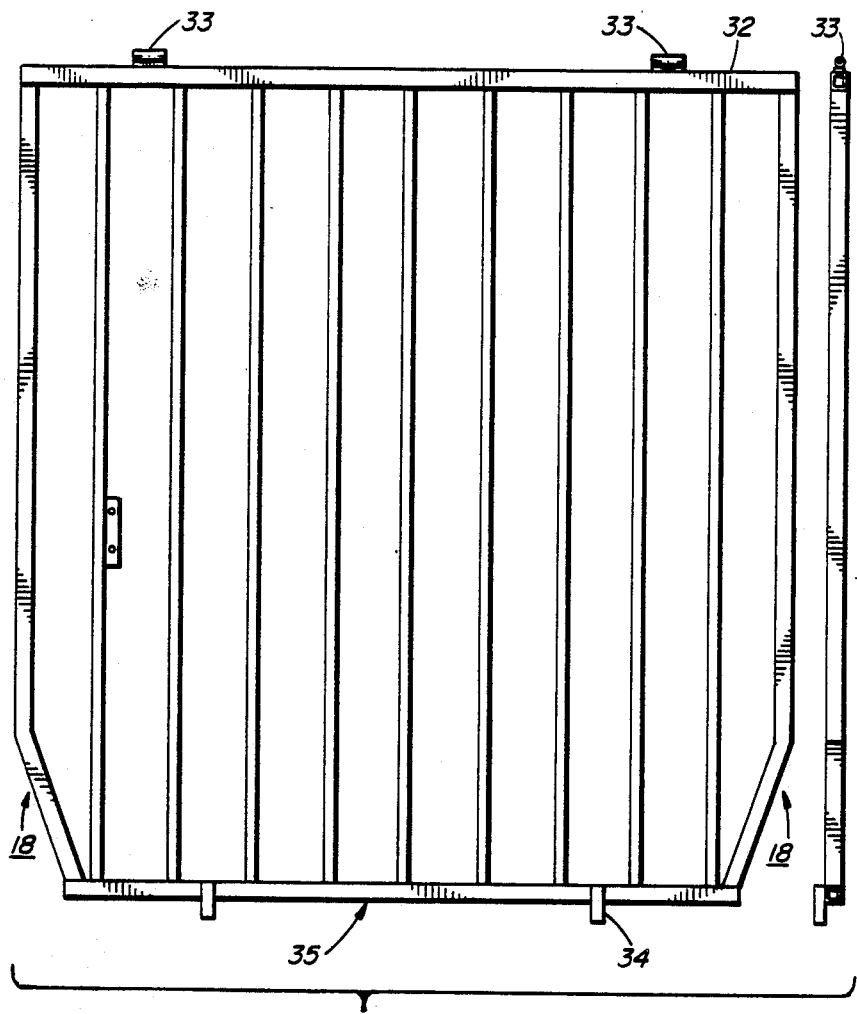
FIG. 3 is a rear view of the bale container (especially the end gate).

Referring to FIG. 3, the end gate 18 extends across the full width of the container 11 and is hinged at its upward end 32 at hinge points 33 with a conventional latch-type closure 34 at its lower end 35 such that it can be swung open for the full width of the basket when unloading. The use of the caster type front wheel 13 permits easy backing up and turning of the hay basket.

Since the bales are gradually moved into the container and not thrown, there is little likelihood of the container being damaged through the propulsion of the bales.

I claim:

1. A hay basket for accumulating hay bales received from a conventional hay baler and carrying the accumulated bales to a remote storage area comprising:
    (a) a frame having forward and rearward portions;
    (b) a container for bales mounted on and supported from a rearward portion of said frame;
    (c) an elongated chute means fixed to said container and to forward portions of said frame and sloping upwardly and rearwardly from said forward portion of the frame toward and into an upper frontal portion of said container means, to direct bales from the baler outlet to the interior of said container; and
    (d) said chute means having inlet guide means at the extreme forward end thereof for receiving bales from the baler outlet and an outlet portion connected to the upper frontal portion of said container, said chute means being adapted to confine the bales in an end-to-end relationship with each other and to direct the said bales from the inlet guide means to the chute outlet portion such that, in use, bales are deposited into the container through the successive displacement of the bales as they are ejected by the baler which moves the said bales in a consecutive fashion in an end-wise relationship through the inlet guide means, along the chute means, and out the chute outlet portion into the container;
    (e) the frontal portion of said container means to which said chute outlet portion is connected being sloped in such a fashion that said deposited bales slide downwardly and rearwardly into said container means;
    (f) said frame of said hay basket being mounted on and fully supported by a spaced apart pair of fixed wheels located at the rearward portion of said frame and castored or pivoted wheel means mounted to the forward portion of said frame to permit ready backing up and turning of the hay basket and so that the hay basket closely follows a baler or tractor, and hitch means connected to the forward portion of said frame, said hitch means being forward of said castored or pivoted wheel means for towing of said baler or tractor whereby when towed directly by a baler said hay hay basket either by a hay basket functions as a device for accumulating bales received from the baler, and when towed directly by a tractor the hay basket functions as a transport device for carrying accumulated bales to a remote storage area,
    (g) a stop means being mounted on said chute means adjacent said inlet guide means, which stop means permits bales to be moved up the chute means but prevents bales within the chute means from moving down and escaping from the chute means;
    (h) said container having a rear wall which is hinged adjacent an upper edge thereof to permit said rear wall to be swung open for unloading of said deposited bales, so that at least some of said deposited bales will fall out of said container under the force of gravity should said rear wall be opened.

2. The hay basket of claim 1 wherein the inlet guide means include an extension pivotally attached adjacent to the forward end of the chute means and which extends towards the outlet of the baler when in use and supports the bales from below as they move into the chute means.

3. The hay basket of claim 1 wherein the inlet guide means are comprised of members attached adjacent to the chute forward end and extending forwards towards the baler outlet to provide a funnel-like guide means the cross-sectional dimensions of which gradually increase in the forward direction to the end of the guide means adjacent to the baler outlet.

4. The hay basket of claim 1 wherein the chute means comprise a plurality of spaced apart elongated members extending longitudinally of the chute means and arranged to, in use, surround and confine the said bales.

5. The hay basket of claim 4 wherein said container is of an open lattice-work-like construction comprising spaced apart bars or tubes welded together.

* * * * *